(12) United States Patent
Hession et al.

(10) Patent No.: US 7,403,607 B2
(45) Date of Patent: Jul. 22, 2008

(54) DIRECTING CONTACTS BETWEEN AN END USER AND A CONTACT CENTER AGENT

(75) Inventors: Patrick Hession, Galway (IE); Andrew Prokop, St. Paul, MN (US); Tony McCormack, Galway (IE)

(73) Assignee: Nortel Networks, St. Laurent, Quebec (CA)

( * ) Notice: Subject to any disclaimer, the term of this patent is extended or adjusted under 35 U.S.C. 154(b) by 951 days.

(21) Appl. No.: 10/743,971

(22) Filed: Dec. 23, 2003

(65) Prior Publication Data
US 2005/0135335 A1   Jun. 23, 2005

(51) Int. Cl.
*H04M 3/00* (2006.01)
(52) U.S. Cl. .................... 379/265.12; 379/265.09
(58) Field of Classification Search ............ 379/265.12, 379/265.09
See application file for complete search history.

(56) References Cited

U.S. PATENT DOCUMENTS

| | | | |
|---|---|---|---|
| 2003/0016812 A1* | 1/2003 | Rodenbusch et al. ... | 379/266.05 |
| 2003/0232623 A1* | 12/2003 | Balasuriya et al. .......... | 455/507 |
| 2005/0129211 A1* | 6/2005 | Gallagher et al. ...... | 379/265.02 |

* cited by examiner

*Primary Examiner*—Creighton H Smith
(74) *Attorney, Agent, or Firm*—Barnes & Thornburg LLP (57) ABSTRACT

Many types of contact center are arranged such that communications between contact center agents and customers or other end users are contingent upon, or dependent upon, successful operation of the contact center itself. However, if the contact center is not working for any reason, contacts cannot be directed between agents and end users. This is addressed by directing contacts between an end user and contact center agents, without the need for operation of the contact center itself. In order to achieve this a plurality of associations between contact center agent addresses and the contact center address are made, stored and prioritised at a communications network node.

20 Claims, 3 Drawing Sheets

DIRECTING CONTACTS BETWEEN AN END USER AND A CONTACT CENTER AGENT

FIELD OF THE INVENTION

The present invention relates to a method and apparatus for directing a contact between an end user and a contact center agent, without the need for operation of the contact center itself.

BACKGROUND TO THE INVENTION

Call centers are known in which incoming calls are routed to one of a plurality of agents. For example, the call center might provide help desk facilities for a particular group of products. Customers are able to call in and be allocated to an agent who has the necessary skills to deal with the customer's query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

The terms "call center" and "contact center" as used herein are not intended to be restricted to situations in which telephone calls are made to the center. Other types of call or contact are also envisaged, such as email, fax, SMS, chat, web access, video access and any other suitable method of contact including conventional telephone calls and voice over internet protocol telephone calls. Similarly, the terms "call" and "contact" as used herein are not intended to be restricted to conventional telephone calls but include contacts made by email, fax, voice over IP and any other suitable medium.

Many types of contact center are arranged such that communications between contact center agents and customers or other end users are contingent upon, or dependent upon, successful operation of the contact center itself. For example, in many known contact centers a public branch exchange (PBX) is associated with the contact center. The contact center uses the PBX to transfer incoming calls to particular contact center agent queues that it selects. In this way calls between contact center agents and customers or end users are controlled by the contact center which is able to monitor status of the contact center agents to determine whether they are busy on calls, logged in or logged out etc. and to provide reports. However, if the contact center is not working for any reason, contacts cannot be directed between agents and end users.

Contact centers are also known which deal with other media types of call such as email, video, voice over internet protocol, and others. Again, for these types it is typical for the contact center itself to control communications between the contact center agents and the customers or end users. This is typically achieved in such a way that if the contact center is not working for any reason contacts cannot be directed between agents and end users.

Previously this problem has been addressed by using a fall back contact center which mirrors the main contact center itself. In the event that the main contact center is not working for any reason, the fall back contact center is able to take over and direct contacts. However, this is an expensive option because two contact centers need to be provided, ideally at different geographical locations, to reduce the likelihood of both centers being impacted at the same time. There is also the need to ensure that the fall back contact center is always up to date with the current status of the main contact center. Achieving that mirroring of data is a complex problem that also takes up network capacity that could otherwise be used for other traffic.

Another approach has been to use a conventional automatic call distribution (ACD) system as a fall back. A conventional ACD system is typically less expensive than providing a complete mirrored contact center. This approach is suitable for call centers using an associated PBX and it allows contacts to be automatically directed to contact center agents in the event that the contact center itself is not operating. However, conventional ACD systems are not suitable for handling all media types such as voice over internet protocol contacts, email contacts, video contacts and others. In that case fallback ACD systems cannot be used.

Another option is to simply forward all incoming contacts to a recorded announcement system asking the customers to call back later, or to a music on hold system or similar. However, this is not satisfactory for customers and leads to loss of business for the contact center.

OBJECT TO THE INVENTION

The invention seeks to provide an improved method and apparatus for directing a contact between an end user and a contact center agent, without the need for operation of the contact center itself.

The invention also seeks to provide an improved method and apparatus for directing a contact between an end user and a contact center agent which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

Many types of contact center are arranged such that communications between contact center agents and customers or other end users are contingent upon, or dependent upon, successful operation of the contact center itself. However, if the contact center is not working for any reason, contacts cannot be directed between agents and end users. This is addressed by directing contacts between an end user and contact center agents, without the need for operation of the contact center itself. In order to achieve this a plurality of associations between contact center agent addresses and the contact center address are made, stored and prioritised at a communications network node.

According to an aspect of the invention there is provided a method of directing a contact between an end user and a contact center agent, without the need for operation of the contact center itself; said method comprising:
  recording a plurality of associations between addresses of contact center agents and an address of the contact center at a node in a communications network, the end user and contact center agent having access to that communications network;
  prioritising said plurality of associations;
  on the basis of the highest priority of said plurality of associations, directing a contact between an end user of the contact center and a contact center agent and, if this operation fails, making said direction on the basis of the next highest priority of said plurality of associations.

This provides the advantage that should the contact center be out of action for any reason it is still possible to direct customer contacts to contact center agents, or for those contact center agents to proactively initiate contacts. This is achieved in a simple and cost effective manner without the need for mirroring of the contact center itself. Also, by suitable prioritisation of the associations, customer contacts can be directed to contact center agents in a prespecified manner rather than at random, on a trial and error basis, or on a first come first served basis. This improves customer service in the event that the contact center itself is out of action, for example, for repair, upgrade or other reasons.

In a particular embodiment the direction of contacts between user and agent is otherwise contingent upon operation of the contact center. For example, the contact center is arranged as a pass through proxy or back to back user agent with respect to the contact center agent endpoints. In this situation the contact center is able to monitor and keep tabs on the status of the contact center agent endpoints. However, if the contact center is not available for any reason, contacts could not be directed to or from the contact center agent endpoints if it were not for the method of the present invention being implemented.

In a preferred embodiment a plurality of addresses are formed for said contact center, each address associated with a skillset, and an association is formed between each of those addresses and location details of said contact center. For example, these addresses are provided to end users or customers who can then direct their contacts to particular ones of those addresses depending on the skillset required. This provides improved service for customers and reduces the burden on the contact center of determining which skillset is most appropriate.

In another embodiment the method further comprises recording at said node an association between an address of a contact center treatment system and location details of said contact center. For example, said contact center treatment system is selected from any of an interactive voice response (IVR) system, a music on hold system and a recorded announcement system. In this way, contacts can be directed automatically to the treatment system in the even that the contact center itself is unavailable. The treatment system is preferably arranged to forward the contacts to contact center agent endpoints after it has applied treatment to the contact.

Preferably the node at which the plurality of associations are recorded is a registrar according to session initiation protocol (SIP). This provides the advantage that existing equipment can be used to provide this function.

The invention also encompasses a communications network arranged to carry out the method described above. Advantageously, said communications network is a data communications network selected from a session initiation protocol network, an H.323 network and a voice over internet protocol network.

According to another aspect of the present invention there is provided a contact center arranged to form a plurality of associations between contact center agent endpoints and an address of the contact center itself; said contact center comprising:

an input arranged to receive registration requests from the contact center agent endpoints, each registration request comprising information about the location of a contact center agent endpoint;

a processor arranged to modify the registration requests by adding information about the location of the contact center itself;

an output arranged to forward the modified registration requests to a registration node in a communications network; and wherein said processor is further arranged to create additional registration requests and forward those to the registration node such that, for a given address of the contact center, a plurality of registration requests are made, each registration request being to create an association between an address of a contact center agent endpoint and that address of the contact center.

This provides the advantage that multiple registrations are formed for one address of the contact center. These multiple registrations enable contacts to be forwarded to and from contact center agent endpoints in the event that the contact center itself is unavailable.

Preferably the processor is further arranged to prioritise those registration requests relating to a particular address of the contact center. This provides the advantage that contacts can be forwarded in a prespecified manner in the event that the contact center is unavailable and this improves customer service. The prespecified manner is arranged such that the most appropriate contact center agents are chosen first.

The invention also encompasses a corresponding method of forming a plurality of associations between contact center agent endpoints and an address of the contact center itself; said method comprising the steps of:

receiving registration requests from the contact center agent endpoints, each registration request comprising information about the location of a contact center agent endpoint;

modifying the registration requests by adding information about the location of the contact center itself;

forwarding the modified registration requests to a registration node in a communications network;

creating additional registration requests and forwarding those to the registration node such that, for a given address of the contact center, a plurality of registration requests are made, each registration request being to create an association between an address of a contact center agent endpoint and that address of the contact center.

Preferably the method further comprises prioritising those registration requests relating to a particular address of the contact center.

The invention also encompasses a computer program arranged to control a contact center in order to carry out the method described above.

According to another aspect of the invention there is provided a communications network comprising a contact center as described above.

The invention also encompasses a contact center arranged to form a plurality of associations between contact center agent endpoints and an address of the contact center itself; said contact center comprising:

means for receiving registration requests from the contact center agent endpoints, each registration request comprising information about the location of a contact center agent endpoint;

means for modifying the registration requests by adding information about the location of the contact center itself;

means for forwarding the modified registration requests to a registration node in a communications network; and means for creating additional registration requests and forwarding those to the registration node such that, for a given address of the contact center, a plurality of registration requests are made, each registration request being to create an association between an address of a contact center agent endpoint and that address of the contact center.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

As mentioned above, many types of contact center are arranged such that communications between contact center agents and customers or other end users are contingent upon, or dependent upon, successful operation of the contact center itself. For example, in order that the contact center can continually monitor the status of its associated agents, the contact center itself is often an essential requirement for a communication session to be established between a contact center agent and another party. A prior art example of this is the use of a so called "first party call control model" in a session initiation protocol (SIP) enabled contact center. Details of this type of contact center and its use are described in earlier U.S. patent application Ser. No. 09/589,326 filed on Jun. 2, 2000 which is also assigned to Nortel Networks Limited and the contents of which are hereby incorporated by reference. Although the example below is specific to SIP other suitable protocols could be used such as H.323 and the invention encompasses use of any such suitable protocols.

As known in the art, SIP is a protocol that can be used to set up communication sessions over a packet data network where those communication sessions are for voice, video, instant messaging (IM) or other suitable media. This is often referred to as "voice over internet protocol" (VoIP) although the communication sessions are not limited to voice. A SIP enabled contact center is thus able to handle contacts received over a SIP data network and these may be of many different media types. SIP is defined in IETF RFC 3261, and other relevant SIP related IETF RFCs.

Figure 1:
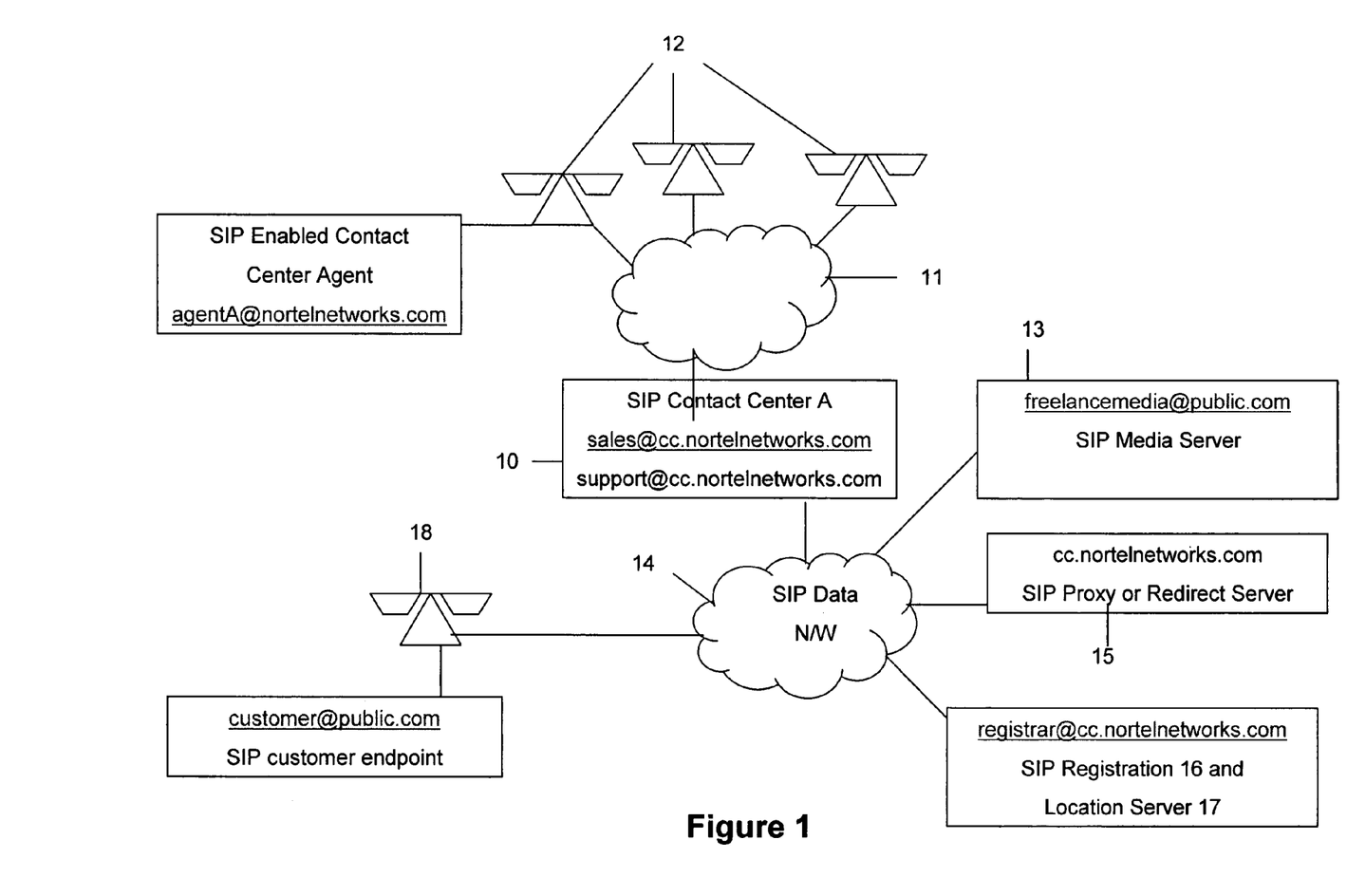
FIG. 1 is a schematic diagram of a communications network with a system for directing contacts without the need for operation of a contact center.

FIG. 1 is a schematic diagram of a SIP enabled contact center in a communications network. The contact center comprises a server 10 connected via a SIP data communications network 11 to a plurality of SIP enabled agent terminals 12. The communications network 11 can be an enterprise network that is connected to another data network 14 such as the Internet or a company-wide Intranet. The enterprise network 11 may be private with respect to the other data network 14 and in that case network address translators are used as known in the art. That is, for reasons of clarity, only those components of the SIP contact center and networks needed for explaining the invention are shown in FIG. 1. Other components are used as known to the skilled person in the art.

The contact center server 10 acts to receive contacts from end users 18 connected to it via the SIP data network 14. These contacts are distributed to appropriate agents 12 by the entry system of the contact center server 10. The contact center optionally also uses a SIP media server 13 which is used to provide additional functionality for the contact center entry system. For example, this can be music-on-hold, recorded announcements or interactive voice response as known in the art. In FIG. 1 the media server 13 is shown as a physical block being a separate entity from the contact center server 10. However, this is not essential. A single server configuration can also be used in which the media server, contact center entry system, contact center server, SIP registrar and SIP proxy are provided using a single server. Thus the media server 13 as represented in FIG. 1 is either a physical or logical block. It is also possible for the media server 13 to be provided by a different party than that providing the contact center 10.

The SIP data network also comprises a SIP proxy or redirect server 15 and a SIP registration 16 and location 17 server as known in the art. Although only one of each of these items is illustrated others may be present in the data network 14. It is not essential for the SIP registration and location server to be provided at the same entity, these items may be separate as known in the art.

Any or all of the media server 13, proxy server 15, redirect server, registrar 16 and location server 17 may be provided by third parties. SIP Endpoints as represented by the contact center agent termination point could also be third party.

As mentioned above SIP is defined in IETF RFC 3261 and other RFCs and comprises various different types of entity including SIP endpoints, SIP registrars, SIP location servers and SIP proxy or redirect servers. The way in which these entities are applied in the present embodiment is now described.

SIP Endpoints

SIP endpoints for the purposes of this embodiment are considered as intelligent stateful entities consisting of a SIP endpoint (Client) and SIP UAS (Server). SIP endpoints can terminate or originate SIP sessions which can contain user to user information (e.g. Instant Messaging) or negotiation messaging to set up other parallel information streams (e.g. SDP). They can also terminate or originate Voice, Video or other multimedia messaging streams or redirect these streams to other entities as negotiated potentially via the Session Description Protocol (SDP) information transported over SIP. SDP is variously covered by RFC3264 and RFC2327.

In this embodiment SIP endpoints REGISTER their location as per RFC3261 with a SIP Registrar 16 and have an identified Proxy 15 or redirect server through which SIP sessions are passed for Address Resolution and other such functions.

SIP endpoint types for this architecture include: SIP Clients (the Contact Center Agent User Interface 12); SIP Media Server 13 (the media and treatment response entity) the SIP contact center server 10, and optionally, the customer's endpoint or terminal 18. However, as mentioned above it is not essential for the invention to be implemented using SIP.

SIP Registrar 16

The SIP Registrar 16 is an entity to which the SIP endpoints send REGISTER messages to identify their current location in the data network 14. Generally the SIP Registrar 16 stores data in the location server (or is one and the same as the location server 17 as illustrated in FIG. 1). A further requirement of the SIP Registrar is generally to provide authentication services for the SIP user 18 (confirm user is configured and validates user password). Various authentication services are common including HTTP Digest (RFC2069 and RFC2617).

As explained in RFC3261 a register request can be used to add, remove and query bindings. In the present embodiment, these bindings are used to form an association between selected agents and addresses of the contact center server 10. A register request can be used to add a binding between one or more contact addresses and an address of record. A "SIP address of record" (AOR), as defined in RFC3261, is a SIP or SIP Universal Resource Indicator (URI) that points to a domain with a location service that can map the URI to another URI where the user might be available. Typically, the location service is populated through registrations. An AOR is frequently thought of as the "public address" of the user.

This registration process can be performed by a suitably authorised third party on behalf of a particular address of record. In the embodiment being described, the suitably authorised third party is the contact center server 10. It is also possible for a SIP client to remove existing bindings or query to find out which bindings currently exist for an address of record.

SIP Location Server 17

The location server 17 stores information that assists in resolving a User's Address of Record URI to an actual location that a User is currently Registered at. A SIP proxy or redirect server is able to input a URI to the location server and obtain details of any associated URIs to which to send a request. The information accessible to the location server is either obtained as a result of registrations made at the Registration Server or may be mapping functions configured at the direction of an administrator.

SIP Proxy or Redirect Server 15

This provides redirect or forwarding services for SIP sessions. If entity A wishes to initiate a session with entity B it can use SIP Proxies to resolve the location of the endpoint and move the request "closer" to entity B until such time as the Proxy nearest entity B presents the session directly to it.

A high level description of prior art establishment of a communication session in a SIP contact center is now given. This is a so called "first party call control model" and as mentioned above, one problem with this type of method is that when the contact center itself is non-operational, it is not possible to direct contacts between end users and the contact center agents.

In order that the contact center 10 is able to monitor the status of its associated contact center agents 12 the contact center 10 is used as a "pseudo" proxy server. That is the contact center 10 is arranged to be active on the signalling path of all contact center agent 12 calls, incoming or outgoing. As known to the skilled person, control signals are sent between entities in a SIP data network to negotiate and set up a communications session which is then used to for a media stream such as a voice call, video session or other. The contact center 10 is arranged to be active on the path that these control signals take in order that the contact center 10 can keep tabs on the activity of its associated agents 12. The media stream itself may take a different route from the control signals through the network between the contact center agent and end user.

When a SIP endpoint makes a request to initiate a communications session to a called party it sends this request to its prespecified, default proxy or redirect server. That proxy or redirect server accesses binding information from a registrar and uses that binding information to forward the request towards the called party. By making appropriate registrations at the registrar it is ensured that all requests to initiate communications to or from the contact center agents 12 are forwarded via the contact center server 10. In addition, the SIP endpoints of the contact center agents 12 are configured to point to the contact center 10 as their default proxy server. This process is known in the art as mentioned above. The contact center server 10 is referred to as acting as a "pass-through proxy" or as a Back to Back User Agent (BBUA).

In order to make the appropriate registrations at the registrar, the SIP endpoints of the contact center agents 12 are configured to send their Register requests to the contact center server 10. The contact center server 10 then modifies these Register requests to mandate the insertion of the contact center server 10 itself in all SIP calls directed to the contact center agents 12. This is done by modifying the contact header or path header of the SIP Register messages as known in the art. After appropriate modification, the contact center server 10 passes on the SIP Register message to the actual Registrar 16 and associated proxy server 15.

As a result the contact center server 10 needs to be operational in order for communication sessions to be set up between contact center agents 12 and other entities in the network. If the contact center server 10 is not available for any reason, such as a fault or because the server is taken off-line for maintenance or upgrade, then the contact center agents 12 are unable to participate in communication sessions even though they would otherwise be able to. The present invention enables contacts to be directed to or from the contact center agents 12 without the need for the contact center server 10. As well as this there is a need to provide a fall-back provision for at least part of the primary role of the contact center. The primary role of the contact center is considered to be resolution of the requirements of incoming contacts to particular skillsets and locating idle agents within those skillsets to which the contacts can be directed. This is achieved by recording a plurality of associations between contact center agent addresses and addresses of the contact center server 10 and prioritising those associations.

Figure 2:
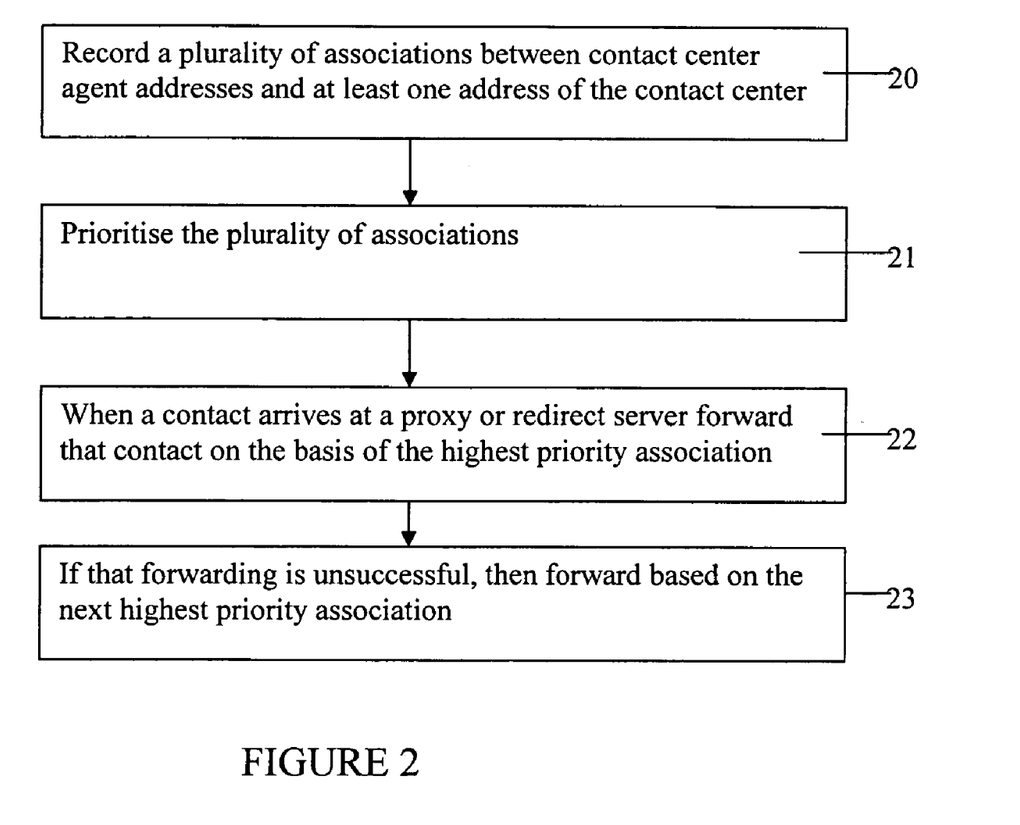
FIG. 2 is a flow diagram of a method of directing contacts without the need for operation of a contact center.

With reference to FIG. 2, a plurality of associations between contact center agent addresses and addresses of the contact center server 10 are recorded (see box 20) at a registrar in a communications network (for example, item 16 in FIG. 1). Those associations are prioritised (see box 21 of FIG. 2).

As mentioned above, when a SIP endpoint issues a comunication request, such as a contact to the contact center server, this request is sent to the default proxy server associated with the SIP endpoint. The proxy server requests association information from the registrar in order to decide where to forward the contact on its journey towards its destination (for example, the destination is a contact center agent or an end user). This association information is also referred to as a binding. In the present invention, a plurality of bindings are provided associated with one or more addresses of the contact center server 10.

The contact center server registers its own address (such as its unique internet protocol (IP) address) against one or more SIP addresses of record such as sales@cc.nortelnetworks.com. End users or customers wishing to contact the contact center use any of these SIP addresses of record and the association information is used to forward the contact to the actual contact center server 10 (see box 22 of FIG. 2).

This association between the contact center server's own address and SIP address(es) of record are given highest priority. Other associations are also registered at the registrar between the SIP addresses of record of the contact center and IP addresses of the contact center agents. Those associations are prioritised.

If a proxy or redirect server uses a highest priority association to forward a contact to or from the contact center server 10 and that operation fails, the next highest priority association is used (see box 23 of FIG. 2).

In one embodiment the contact center server 10 registers one or more addresses for itself which it uses to partition incoming contacts into high level applications or skillsets (for example, sales@cc.nortelnetworks.com; support@cc.nortelnetworks.com). End users or customers are aware of these addresses and are able to direct their contacts to those as appropriate. For example, a customer with a sales query uses the sales@cc.nortelnetworks.com address. Contact center agent addresses are associated with these addresses and prioritised as described above. In that way, even when the contact center server 10 is out of action, a customer is able to direct a contact to a contact center address and be forwarded to a particular agent using the prioritised associations. The priority is advantageously arranged such that the most skilled agent for a skillset will be offered the contact first, followed by the next most skilled agent and so on. The priority system can be configured in other ways as required by the contact center provider.

In the case that the contact center server 10 registers only one address for itself this address can be thought of as a generic skillset against which all contact center agents are sequentially registered. If the contact center server 10 registers two or more skillset addresses for itself (such as sales@cc.nortelneteworks.com and support@cc.nortelnetworks.com) then each contact center agent is sequentially registered against one or more of those skillset addresses.

In a preferred embodiment SIP protocol is used as mentioned above and in that case the plurality of associations and their prioritisation is achieved by making use of existing facilities within the SIP protocol. That is, no modification to the existing SIP protocol is required.

As mentioned above, SIP provides the ability to make registrations at a registrar. REGISTER requests are used to add, remove and query bindings and thus are used in this embodiment to make the associations between the contact center agent addresses and the secondary contact center addresses. REGISTER requests can be made by a suitably authorised third party and so in this embodiment, the contact center server is arranged to make REGISTER requests on behalf of the contact center agent endpoints 12.

SIP also allows that once a SIP endpoint has established bindings at a registrar, it may send subsequent registrations containing new bindings or modifications to existing bindings. This enables the contact center server 10 to make multiple registrations for a given contact center agent endpoint. These multiple registrations enable the priority of associations to be set up. This is advantageous because priority information that is typically inherent in internal contact center queues is at least partly captured and used for "fall back" situations when the contact center itself is unavailable. That priority information from the contact center is effectively being captured by dynamically forming a SIP (or other protocol) queue at the proxy server or other network node.

In order to prioritise the associations, an existing SIP mechanism is exploited whereby a parameter within a SIP message is used. The particular parameter chosen is the "q" parameter of the SIP contact header field. This "q" parameter is used to indicate a relative preference for the particular contact header field value compared to other bindings for this address-of-record. This mechanism exists in the SIP protocol to allow users to register multiple endpoints, such as a home computer, work computer, and mobile handset, against a single SIP address of record. These bindings are prioritised in order that a proxy server can use the preference indication to determine which binding to use in a particular situation. The present invention takes this existing mechanism and uses it in association with a contact center system as described herein. Advantageously no modifications to the SIP protocol itself are required.

Figure 3:
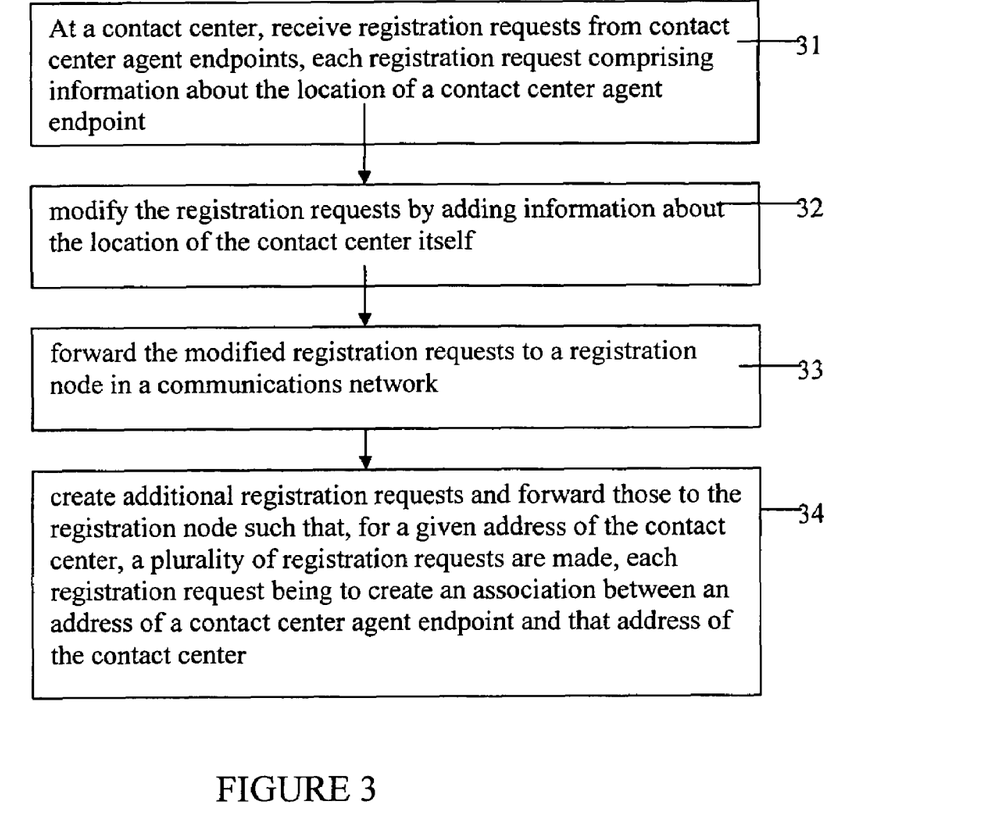
FIG. 3 is a flow diagram of a method of operation of a contact center.

A particular example of a method carried out by a SIP enabled contact center server 10 is now described with reference to FIGS. 1 and 3. Details of the registration are held at the location server 17 in conjunction with the registrar 16 as known in the art. The default proxy server for the contact center server 10 is preconfigured and in this example is proxy 15 of FIG. 1.

Preferably the contact center server 10 also registers its own IP address against one or more SIP address of records, also referred to as skillset specific URIs (universal resource indicators) such as sales@cc.nortelnetworks.com and support@cc.nortelnetworks.com.

Contact center agents at the contact center have SIP enabled endpoints 12 and these are configured such that their default proxy server is the contact center server 10 itself. Because of this, the contact center server receives any register requests issued by the contact center agent SIP endpoints. For example, such register requests are made automatically by the SIP endpoints 12 on start up and optionally also at other times.

These register requests contain details of the location of the contact center agent SIP endpoint which made the request. These location details can comprise for example, an IP address, a conventional telephone number a DNS (network name address), a SIP or SIPS URI of the endpoint. (SIPS denotes secure SIP which involves carrying all SIP information over an encrypted transport mechanism.) The location details are stored in a SIP contact header which forms part of the register request.

The contact center agent's SIP endpoint issues the register request and that is forwarded to the default proxy server, which in this case is the contact center server 10 as mentioned above.

When the contact center server 10 receives the register request it modifies that request before forwarding it on to the actual registrar 16. This modification ensures that the location details of the contact center agent endpoint are changed or replaced by location details of the contact center server 10 itself.

Any suitable method of modifying the location details can be used. For example, the contact header information is changed by replacing the current details of the location of the contact center agent with the SIP address of record of the contact center server 10. In this case the contact center server 10 stores the original contact header information containing the location details for the contact center agent endpoint. That original information can then be used to direct contacts to that agent.

Alternatively, instead of modifying the contact header information, a path header is added as specified in IETF RFC 3327.

If a particular agent is a member of more than one skillset, that agent is able to register at least once for each skillset that it is a member of. For example, if an agent is a member of skillset sales, then that agent can send a first registration request which will be formed in respect of a skillset address of the contact center server 10 such as sales@cc.nortelnetworks.com. The agent can also be registered against any other relevant skillset URI's that the Contact Center is responsible for (or terminates).

Consider the situation in which the sales@cc.nortelnetworks.com address of record has two addresses registered against it. These two addresses are that of the contact center itself and contact center agent endpoint A. The registration in respect of the contact center address is given higher priority than that of the contact center agent endpoint A. For example, this is done using the SIP q parameter as described above.

Once the registration and prioritisation process has been completed contacts can be directed to and from the contact center agents as follows. A method of sending a contact from a customer endpoint 18 to the contact center is first described in the case that the contact center server 10 is operational. The customer has access to the URIs for the contact center such as sales@cc.nortelnetworks.com. Using one of these URIs the customer sends a contact into the contact center. The contact center server 10 then optionally uses the media server 13 to treat the incoming contact in any suitable known manner. For example, the media server may comprise an interactive voice response (IVR) system, recorded announcement system or other suitable treatment system. The contact center uses any results from the media server treatment of the contact to determine which agent or skillset to allocate the contact to. This process is known in the art. The contact center also optionally retrieves any relevant customer data from its records including records of past transactions. When a suitable agent becomes available the contact center forwards the contact to that agent together with any relevant retrieved information. The contact center agent handles the contact and details of this are recorded as appropriate.

Consider the case that the contact center server 10 is not available for any reason. The customer dials sales@cc.nortelnetworks.com (for example) for service at the start. The proxy server 15 receives the request for contact and forwards it on to that the highest priority address associated with sales@cc.nortelnetworks.com. However, because the contact center server 10 is not available this operation fails or times out. The proxy server 15 then tries the next highest priority address registered against the contact center URI sales@cc.nortelnetworks.com. In this example, the next highest priority address is agentA@cc.nortelnetworks.com.

As a result the contact center agent A receives the contact directly without the need for operation of the contact center server 10. This provides the advantage that the customer is able to receive assistance from the agent who is in part, if not fully, pertinent to the customer's service request. This ensures a continuity of service even in the event that the contact center is not available for any reason. The fact that the contact center itself has failed to accept the contact is transparent to the customer because the customer's contact is automatically forwarded to an agent.

In another embodiment an IVR system or other treatment system is registered against the address of record for the contact center server 10. In this way, when the contact center server 10 is not available, incoming contacts are automatically directed to the IVR or other treatment system by the proxy server 15. For example, the IVR system is arranged to resolve the skillset that the customer wishes to interact with and to forward the contact onto the relevant address of record for the contact center (for example, sales@cc.nortelnetworks.com). When the contact center is not available, the contacts are forwarded on to the next highest priority address as described above.

A method of operating a contact center is now described with reference to FIG. 3. The contact center receives registration requests from the contact center agent endpoints. Each registration request comprises information about the location of a contact center agent endpoint (see box 31 of FIG. 3). The contact center then modifies the registration requests by adding information about the location of the contact center itself (see box 32 of FIG. 3). The modified registration requests are then forwarded to a registration node (see box 33 of FIG. 3). This enables the contact center to act as a pass through proxy or back to back user agent with respect to the contact center agent endpoints. In addition, the contact center creates additional registration requests and forwards those to the registration node (see box 34 of FIG. 3). These created registration requests are arranged so that, for a given address of the contact center, a plurality of registration requests are made, each registration request being to create an association between an address of a contact center agent endpoint and that address of the contact center.

As mentioned above any or all of the media server 13, proxy server 15, redirect server, registrar 16, location server 17 and contact center agent endpoints may be provided by third parties. A particular advantage of the present invention, at least in some embodiments, is that these entities remain unaware of the dynamic configuration the contact center performs on their behalf.

Another advantage is that priority information that is typically inherent in a contact center is used in the present invention to intelligently configure entities external to the contact center itself.

The invention claimed is:

1. A method of directing a contact between an end user terminal and an agent terminal of a contact center, without the need for operation of the contact center itself; said method comprising:
   (i) registering one or more bindings between a network location address of a contact center and one or more addresses of record of said contact center at a node in a communications network;
   (ii) registering one or more bindings between a network location address of each contact center agent terminal and said one or more addresses of record of the contact center at said node in a communications network, the end user terminal and said contact center agent terminal having access to that communications network;
   (iii) prioritising said bindings in an order they are to be used;
   (iv) on the basis of a highest priority one of said bindings, directing a contact between an end user terminal and a network location address associated with said highest priority one of said bindings and, if this operation fails, making said direction on the basis of a next highest priority one of said bindings.

2. A method as claimed in claim 1 further comprising, prior to directing a contact between an end user terminal and a network location address associated with said highest priority one of said bindings, the step of directing a contact between the end user terminal and the contact center using one of said one or more bindings between a network location address of the contact center and the one or more addresses of record of said contact center.

3. A method as claimed in claim 2 further comprising arranging the contact center as either of a back to back user agent and a pass through proxy server.

4. A method as claimed in claim 1 which further comprises forming a plurality of addresses of record for said contact center, each address of record associated with a contact center agent skillset, and forming a binding between each of those addresses of record and said network location address of said contact center.

5. A method as claimed in claim 1 which further comprises registering at said communications network node a binding between a network location address of a contact center treatment system and one of said one or more addresses or record of said contact center.

6. A method as claimed in claim 5 wherein said contact center treatment system is selected from any of an interactive voice response (IVR) system, a music on hold system and a recorded announcement system.

7. A method as claimed in claim 1 wherein said communications network node at which the plurality of bindings are registered is a registrar node operating according to session initiation protocol (SIP).

8. A method as claimed in claim 1 wherein said communications network is a data communications network selected from a session initiation protocol network, an H.323 network and a voice over internet protocol network.

9. A communications network arranged to carry out the method of claim 1.

10. A contact center arranged to generate registration requests to form a plurality of bindings between network location addresses of contact center agent endpoints terminals and one or more addresses of record of the contact center itself; said contact center comprising:
    (i) an input arranged to receive registration requests from the contact center agent endpoints terminals, each registration request comprising information about a network location address of a respective contact center agent endpoint terminal;
    (ii) a processor arranged to modify the registration requests by adding address information about the location of the contact center itself;
    (iii) an output arranged to forward the modified registration requests to a registration node in a communications network; and
    (iv) wherein said processor is further arranged to create additional registration requests and forward those to the registration node such that, for a given one of the one or more addresses of record of the contact center, a plurality of registration requests are made, each registration request being to create a binding between a network location address of a contact center agent endpoint terminal and that one of the one or more addresses of record of the contact center.

11. A contact center as claimed in claim 10 wherein said processor is further arranged to prioritise the additional registration requests relating to a particular one of the one or more addresses of record of the contact center.

12. A contact center as claimed in claim 10 wherein said processor is arranged to form a plurality of addresses of record for said contact center, each address associated with a contact center agent skillset.

13. A contact center as claimed in claim 10 which is either of a pass through proxy server and a back to back user agent with respect to the contact center agent endpoint terminals.

14. A method of forming a plurality of bindings between network location addresses of contact center agent endpoints terminals and one or more addresses of record of the contact center itself; said method comprising the steps of:
    a) receiving registration requests from the contact center agent endpoints terminals, each registration request comprising information about a network location address of a respective contact center agent endpoint terminal;
    b) modifying the registration requests by adding address information about the location of the contact center itself;
    c) forwarding the modified registration requests to a registration node in a communications network;
    d) creating additional registration requests and forwarding those to the registration node such that, for a given one of the one or more addresses of record of the contact center, a plurality of registration requests are made, each registration request being to create a binding between a network location address of a contact center agent endpoint terminal and that one of the one or more addresses of record of the contact center.

15. A method as claimed in claim 14 which further comprises prioritising the additional registration requests relating to a particular one of the one or more addresses of record of the contact center.

16. A method as claimed in claim 14 which comprises forming a plurality of addresses of record for said contact center, each address associated with a contact center agent skillset.

17. A computer program arranged to control a contact center in order to carry out the method of claim 14.

18. A communications network comprising a contact center as claimed in claim 10.

19. A contact center arranged to generate registration requests to form a plurality of bindings between network location addresses of contact center agent endpoints terminals and one or more addresses of record of the contact center itself; said contact center comprising:
    a) means for receiving registration requests from the contact center agent endpoints terminals, each registration request comprising information about a network location address of a respective contact center agent endpoint terminal;
    b) means for modifying the registration requests by adding address information about the location of the contact center itself;
    c) means for forwarding the modified registration requests to a registration node in a communications network; and
    d) means for creating additional registration requests and forwarding those to the registration node such that, for a given one of the one or more addresses of record of the contact center, a plurality of registration requests are made, each registration request being to create a binding between a network location address of a contact center agent endpoint terminal and that one of the one or more addresses of record of the contact center.

20. A method of directing a contact between an end user terminal and an agent terminal of a contact center, said method comprising:
    (i) registering a first binding between a network location address of a contact center and an address of record of said contact center at a node in a communications network;
    (ii) registering a second binding between a network location address of a contact center agent terminal and said address of record of the contact center at said node in a communications network, the end user terminal and said contact center agent terminal having access to that communications network;

(iii) directing a contact between said end user terminal and said contact center using said first binding and, if this operation fails, directing said contact between said end user terminal and said contact center agent terminal using said second binding.

* * * * *